United States Patent Office 2,750,089
Patented June 12, 1956

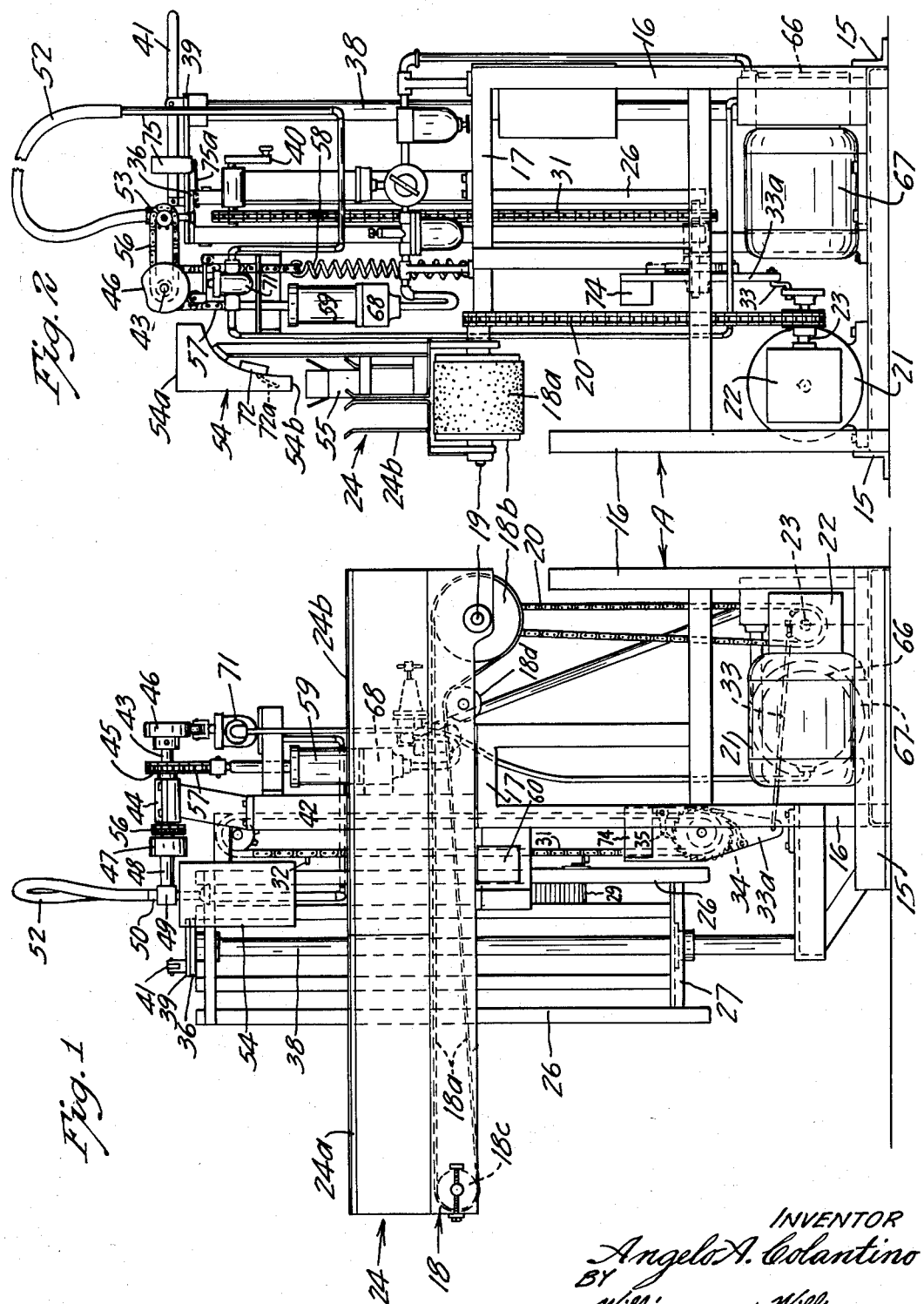

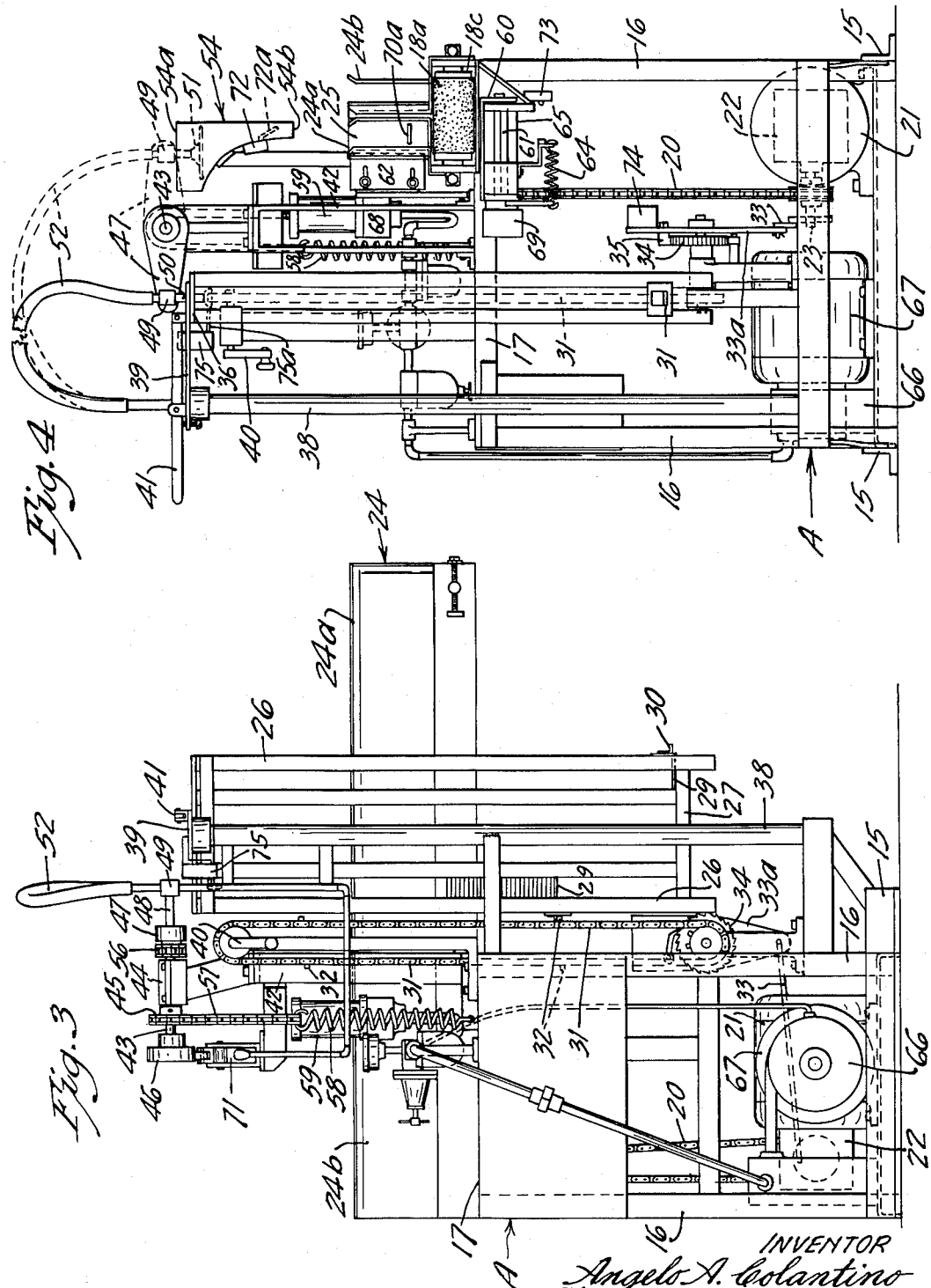

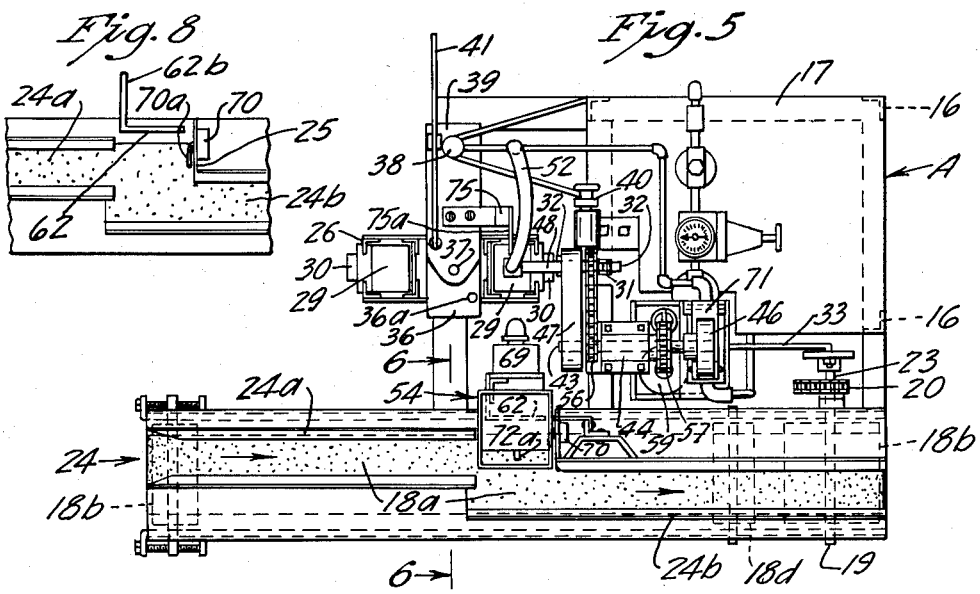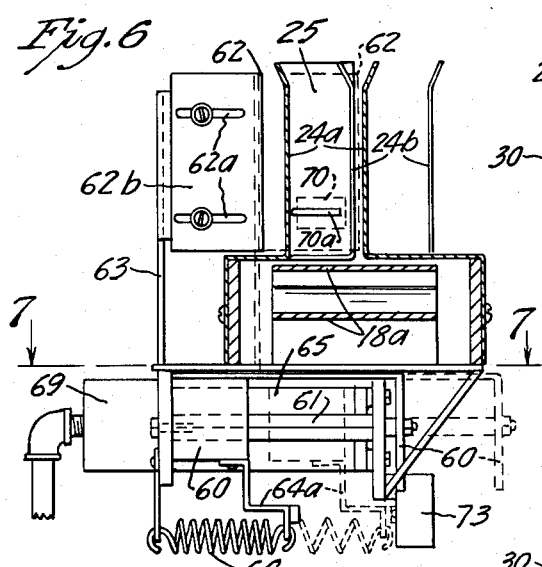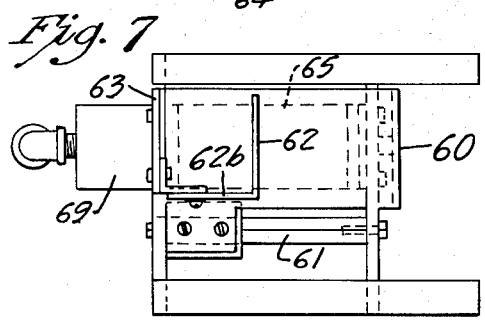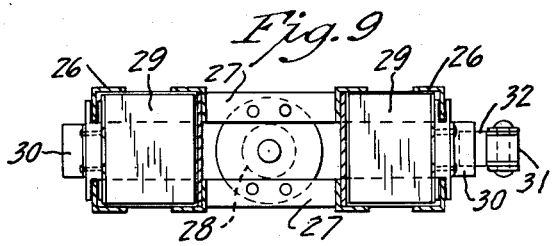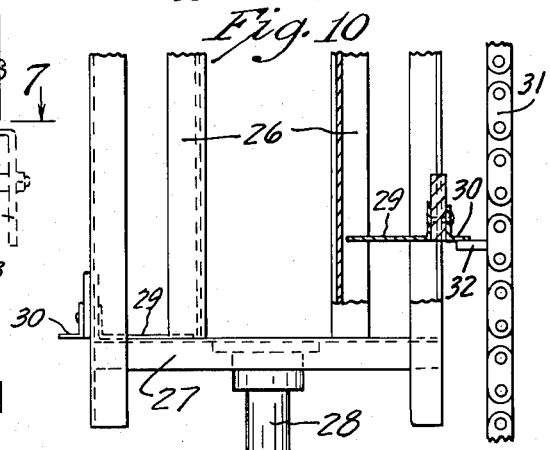

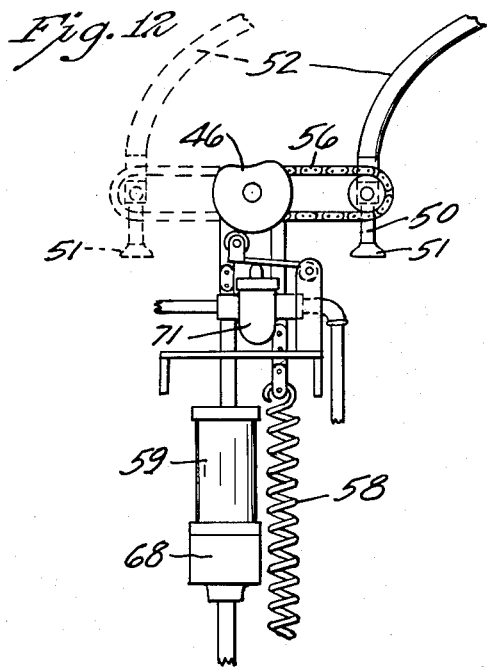
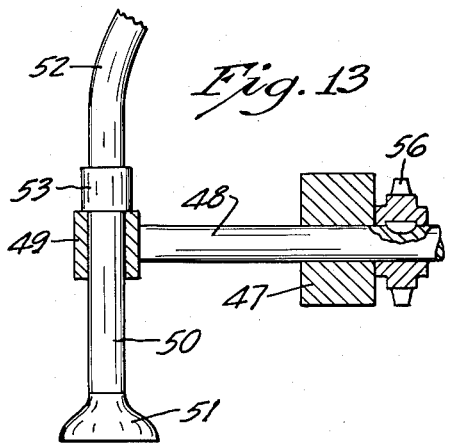
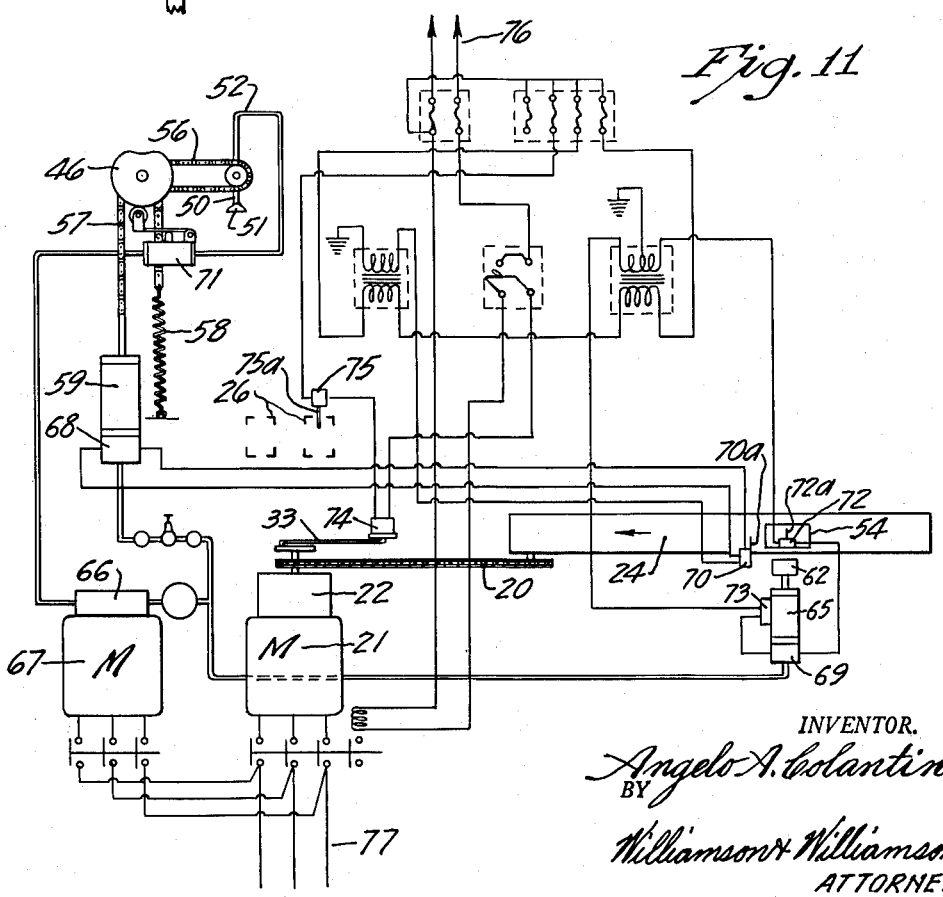

2,750,089

AUTOMATIC MACHINERY FOR DEPOSITING ARTICLES INTO SUCCESSIVELY MOVING CONTAINERS

Angelo A. Colantino, Springfield, Ill., assignor to Pillsbury Mills, Inc., Minneapolis, Minn., a corporation of Delaware Application September 17, 1951, Serial No. 246,972

23 Claims. (Cl. 226—2)

This invention relates to machinery for automatically depositing articles into open topped containers which are progressively moving along a conveyor line and are successively moved into and ejected from article-receiving position.

It has long been a problem to provide a machine adapted to operate with one hundred percent accuracy to positively insure the depositing of an article into an open topped container. For example, in certain types of prepared baking mixes such as hot roll mixes it is necessary to include within the package a previously tightly sealed envelope containing the yeast in a powdered form which is to be mixed by the consumer with the other ingredients immediately before baking, whereby the properties of the yeast are retained until the baking operation. It is a laborious process to drop these yeast containing envelopes into the packages of mix since this has previously been done by hand and each container had to be checked to prevent omission of the yeast. I have successfully solved this problem by producing automatic machinery or apparatus having a control system entirely responsive for actuation to two related factors to produce the necessary steps of operation without requiring any synchronization between the various mechanisms. One of these factors is the movement of a container into predetermined article-receiving position and the other is the progressive positioning of the article to be deposited in the container.

It is an object of my present invention to provide automatic machinery adapted to be interposed into a progressively moving line of packages for depositing an article into each of said packages.

It is another object to provide automatic machinery for depositing an article in each package of a line of progressively moving packages and having a mechanism to positively prevent any package from passing through said machine without having an article deposited therein.

It is a further object to provide automatic machinery for initially positioning an open topped package or container in article-receiving position, transferring an article from supply position to deposit the same into said package and thereafter positively eject said package with the article therein back into the conveyor lines for the next operation.

It is still a further object to provide automatic machinery for successively depositing an article in each package of a line of progressively moving packages by removing the top article from a vertically disposed supply stack, transferring said article to a discharge position, and discharging said article through a guiding hopper, said machinery providing mechanism responsive to the passage of an article through said hopper for ejecting the package into which the particle has been deposited and thereby permit a new package to be shifted into article receiving position to again actuate the article transfer mechanism.

More specifically, it is an object of my invention to provide automatic machinery or apparatus for depositing articles into open topped containers and having a constantly moving conveyor mechanism adapted to be interposed into a progressively moving line of containers to receive the containers from said line, deposit an article therein and discharge the container back into the line, said container merely abutting a stop member and the conveyor slipping across the container bottom during the article-depositing operation, said container engaging a trip element of a control system upon abutment with said stop member to actuate the article transfer mechanism which picks up an article, by a vacuum pickup system, carries the article into discharge position, drops the article through a guiding hopper and into the open topped container, said article tripping a second control system as it passes through said hopper to actuate a container ejector mechanism which shifts the container beyond the stop member to permit the conveyor to carry the same back into the moving line and permitting the next container to move into article-receiving position.

It is still another object to provide control systems for returning each of the mechanisms back into normal position preparatory to the next operation.

It is another specific object to provide an article supply mechanism for progressively shifting articles by step by step movement into pickup position with a limiting control to disengage said shifting mechanism when an article is in the desired predetermined pickup position, thus requiring no synchronization of the supply mechanism with the other mechanisms of my apparatus.

These and other objects and advantages of my invention will more fully appear from the following description made in connection with the accompanying drawings wherein like reference characters refer to the same or similar parts throughout the several views and in which:

Fig. 1 is a front elevational view of the automatic apparatus embodying my invention;

Fig. 2 is a right end elevational view thereof;

Fig. 3 is a rear elevational view thereof;

Fig. 4 is a left end elevational view as viewed from the opposite side from Fig. 2;

Fig. 5 is a top plan view of my apparatus;

Fig. 6 is a vertical sectional view showing the container ejector mechanism in detail;

Fig. 7 is a top plan view of the structure shown in Fig. 6.

Fig. 8 is a fragmentary top plan view of the article depositing and package ejecting area;

Fig. 9 is a horizontal sectional view of the article holding supply magazine;

Fig. 10 is a side elevational view of said magazine with parts thereof broken away to show in section;

Fig. 11 is a diagrammatic view showing the wiring circuits, air system, and inter-relationship of the other mechanisms therewith;

Fig. 12 is an enlarged and elevational view showing my article transfer mechanism; and Fig. 13 is a fragmentary vertical section showing the article pickup element in detail.

As illustrated in the accompanying drawings and best shown in Figs. 2, 3 and 4, I provide a suitable supporting structure designated as an entirety by the letter A and having the base members 15 from which the legs 16 fixed thereto extend upwardly. A horizontally disposed supporting frame 17 is fixed at the top of said legs 16. An endless conveyor mechanism designated as an entirety by the numeral 18 is mounted on said horizontal frame and consists in an endless belt 19 trained about a driving pulley 18b and two idler pulleys 18c and 18d. The driving pulley 18b is fixed to a stub shaft which is constantly driven by the chain and sprocket driving connection 20 as best shown in Fig. 2. An electric motor 21 supplies the driving power to the chain and sprocket drive 20 through a gear box 22. A shaft 23 extends outwardly from gear box 22 to drive the sprocket at the bottom of the driving mechanism 20.

I provide a stationary container or package guiding chute 24 formed in two sections, a feeding section 24a and a discharge section 24b. The discharge section is offset outwardly from the feeding section in parallel relation to a line extended longitudinally from the feeding section. The combined width of these two chute sections 24a and 24b is substantially equal to the width of the constantly moving belt 18a. As best shown in Fig. 8, an article depositing and package ejecting area is formed at the forward end of feeding chute section 24a and an upstanding package stop member 25 transversely traverses the forward end of chute section 24a. The two chute sections have their adjacent end portions overlapped and the two substantially aligned side walls thereof are cut off to provide a package ejecting passage to afford communication between the feeding section 24a and the discharge section 24b and provide a package ejecting area. The chute 24 is adapted to be interposed into a progressively moving conveyor line with the packages fed directly into the feeding section 24a and discharged back into the conveyor line at the discharge end of chute 24b.

In the form shown, my machine is designed to deposit powdered yeast envelopes into hot roll mix packages before the same are sealed. The yeast containing envelopes are retained in a supply magazine best shown in Figs. 1, 3, 5, 9 and 10. In the form shown, the magazine has a pair of upstanding envelope receiving racks 26 rigidly interconnected at their bottom portions to a cross frame member 27, which in turn is journalled for rotation on a vertical axis as by being swingably mounted on the upstanding supporting member 28. An envelope supporting platform 29 is mounted for vertical sliding movement in each of the racks 26 and has an outstanding elevating flange 30 fixed on the outside thereof for operative engagement with an envelope elevating mechanism consisting in the form shown in a vertically disposed intermittently driven chain and sprocket driving mechanism, having an endless chain 31 to which a plurality of spaced outstanding projections 32 are fixed for underlying engagement with the outstanding flange 30 of platform 29. The chain 31 is intermittently driven by a pitman mechanism 33 which is actuated by the rotary shaft 23 which extends beyond the lower sprocket of the driving connection 20. A lever 33a is oscillated by the pitman mechanism 33. A ratchet wheel 34 is intermittently driven by a weight counter-balanced pall 35 connected for oscillation with the oscillating lever 33a, the ratchet wheel 34 intermittently driving the chain 31. The upper portion of the two racks 26 are rigidly interconnected by the connector member 36 which is journalled on the vertically disposed pin 37, best shown in Fig. 5, and which in turn is supported by an upstanding post 38 and crossarm 39 fixed thereto. The upper idler sprocket about which chain 31 is trained is fixed to a journalled shaft to which a hand crank 40 is fixed for initially positioning a stack of yeast envelopes held in the rack 26 which is swung into operative position. A locking pin actuated by lever 41 holds the two racks 26 against inadvertent rotation by extending through an aperture in crossarm 39 and into a selectively aligned aperture 36a formed in the interconnection member 36.

A transfer mechanism is carried on an upwardly extending supporting structure 42 rigidly mounted on the horizontal frame 17. A horizontal shaft 43 disposed longitudinally relative to the chute 24 is journalled for oscillation in a suitable bearing 44 carried by the upper portion of supporting structure 42. A driving sprocket 45 is fixed to the rear end of shaft 43 which extends rearwardly therebeyond and has a vacuum control cam 46 fixed to the extension portion thereof. A transfer crank arm 47 is fixed to the forward portion of said shaft 43 and said arm has a head carrying shaft 48 journalled in the outer free end portion thereof. A transfer head 49 is fixed to shaft 48 and a vertically disposed pickup tube 50 is slidably mounted for limited vertical shifting movement in said head 49. The sliding connection between head 49 and tube 50 is designed to permit vertical shifting movement for purposes that will be brought out later.

A suction cup 51 is fixed to the lower end of tube 50 and has a central aperture formed therein for communication with the interior of said tube. A suction line such as the rubber tube 52 is connected to the upper end of tube 50 in sealed relation thereto and a stop element 53 positively limits the downward sliding movement of the tube 50 in the head 49. The weight of the rubber tube 52, tube 50 and cup 51 will normally maintain said stop 53 engaged with head 49, as shown in Fig. 13. When the transfer arm 47 is swung over into pickup position, the suction cup 51 will be positioned centrally above the rack 26 in which the yeast envelopes to be picked up and deposited in the packages are stacked. When the arm 47 swings over into discharge position, the suction cup 51 will be centrally positioned over an envelope receiving and guiding hopper 54 having a wide mouth portion 54a and a diminished discharge portion 54b, as best shown in Fig. 2. The diminished discharge portion 54b is positioned directly over an open topped package 55 (shown in Fig. 2 by dotted lines) into which the envelope is to be deposited. This package is held against the abutment stop member 25 during the depositing of the envelope therein by the conveyor belt 18a sliding thereunder. The tube 50 is always maintained in vertical position during the swinging movement of the arm 47 by a chain and sprocket driving connection 56 which interconnects shaft 43 and shaft 48 to produce a rotation in shaft 48 similar to the rotation produced in shaft 43.

Rotation is produced in the shaft 43 by a pneumatically shifted chain 57 which is trained about sprocket 45 and meshed therewith. A counter-balancing spring 58 interconnects one end of the chain 56 to the horizontal frame 17 and a double acting pneumatic ram 59 is connected at the other end of said chain.

As best shown in Figs. 4, 6 and 7, I provide an ejector mechanism having a carriage 60 mounted for horizontal shifting movement on a pair of fixed spaced guide bars 61 disposed in spaced relation below the lower run of belt 18a transversely thereof, as best shown in Fig. 6. An ejector pusher plate or plunger 62 having a rearwardly disposed upstanding flange 62b is fixed to the carriage 60 as by the upstanding connection arm 63 and is adjustable relative to said arm transversely of the conveyor belt 18a by the provision of a pair of elongated slots 62a through which a pair of clamping screws are inserted and are threadably received in a suitable bracket at the top of connector arm 63. A counter-balancing spring 64 yieldably urges the carriage 60 rearwardly and the carriage 60 is actuated in both directions by a double acting pneumatic ram 65, shown by dotted lines in Figs. 6 and 7, Fig. 6 showing the pusher plate 62 and carriage 60 in projected package ejecting position by dotted lines and in normal retracted position by full lines.

A vacuum pump 66 driven by an electric motor 67 is provided and supplies the negative air pressure to the suction cup 51 through a conduit to tubes 52 and 50 as well as supplying air under positive pressure to the pneumatic rams 59 and 65. The two rams 59 and 65 are controlled by conventional slide type solenoid actuated air valves, such as are indicated respectively at 68 and 69. An electric microswitch 70 having an actuating arm 70a mounted on abutment stop member 25 causes said ram 59 to be shifted downwardly when an open topped package is engaged against said switch actuating arm 70a, thereby swinging arm 47 from pickup position, as shown by full lines in Figs. 4 and 12, into discharge position as shown by dotted lines in said Figs. 4 and 12, and when the package 55 is removed from switch arm 70a the ram 59 will be shifted upwardly to swing the arm 47 back into pickup position. When the arm 47 swings into discharge position, the cam 46 actuates an air valve 71 to shut off the negative air supply to the flexible tube 52 and introduce atmospheric pressure into said cup 51 through tubes 52 and 50. This releases the envelopes from the suction cup 51 and said envelope falls into the large mouth 54a of hopper 54 and drops through the diminished discharge portion 54b of said hopper into an open topped package 55 positioned against the actuating arm 70a of microswitch 70.

A solenoid actuating element such as a microswitch 72 is mounted at the diminished portion of hopper 54 and has a sensing element such as the actuating arm 72a extending outwardly into said diminished hopper portion. When the switch 72 is closed by an envelope actuating the arm 72a the solenoid valve 69 will be energized into such a position that the pneumatic ram 65 will move forwardly a specified distance until it comes in contact with pusher plate 62 and then project pusher plate 62 outwardly against the package 55 and eject the same beyond the abutment stop member 25 and into the discharge chute section 24a. By allowing the pneumatic ram to move forward a specified distance before projecting the pusher plate outwardly, a sufficient time lag will be provided to permit the yeast envelope to drop the relatively short distance from the hopper 54 into the package 55 disposed therebelow before the package is ejected into the discharge chute section 24a. Another microswitch 73 is mounted in fixed relation on a suitable supporting member and is responsive for actuation to engagement by the spring carrying bracket 64a, as best shown in Figs. 4 and 6. The pneumatic ram 65 pushes the carriage 60 and pusher plate 62 out until microswitch 73 is engaged and actuated. This microswitch then shifts solenoid valve 69 into carriage return position and the pneumatic ram 65 will then carry the pusher plate 62 back into normal position.

A solenoid 74 is mounted on the oscillating lever arm 33a of the pitman driving mechanism 33 and is positioned to shift the dog 35 out of engagement with ratchet wheel 34 into "free wheeling" position to permit free oscillation of lever 33a without driving ratchet wheel 34. A microswitch 75 is mounted on cross arm 39 and has an actuating arm 75a extending outwardly over the operating rack 26 to engage the uppermost envelope therein when said stack of envelopes has been projected upwardly to position said top enevelope in predetermined pickup position. Unless said arm 75a is engaged by said top envelope the dog 35 will engage ratchet wheel 34 and cause the platform 29 to be shifted upwardly and carry said envelopes up into the proper pickup position. When the last envelope has been removed from the operating rack 26, the projection 32 will ride up around the upper sprocket which is positioned slightly below the top of the rack 26 and thus carry said projection 32 out of engagement with the flange 30 and drop the platform 29 to the bottom of said rack. At this point, the other rack 26 will have been properly filled with envelopes and the magazine will be rotated by releasing lever 41 and shifting the filled rack 26 into operative position beneath the pickup cup 51. The vertical shifting movement of the tube 50 in head 49 permits slight variations in the precise elevation of the top envelope without affecting the operative efficiency of the pickup mechanism. The tube 50 is normally in downwardly projected position with stop 53 engaged against head 49, as shown in Fig. 13. However, if the top envelope should be positioned a slight distance above the lower extreme position of the cup 51 the tube 50 will shift upwardly through the head 49 and prevent damage to the envelopes or the parts of the mechanism.

In the form shown, the microswitch and solenoid circuits operate on a stepped down 110 volt power supply indicated at 76 and the two motors 21 and 67 operate on a 440 volt power source indicated at 77. Suitable switches are provided to open both circuits and suitable step down transformers are provided in the 110 volt circuit for operation of the microswitch controlled solenoid circuits.

It will be seen that I have provided a highly efficient automatic machine adapted to be interposed into a moving conveyor line and to deposit an article into each of the packages carried by said conveyor line. The open topped package is held in article receiving position against the stop 25 by the constantly moving conveyor belt 18a until an article is actually dropped through the diminished portion of hopper 54 to actuate microswitch 72 which in turn actuates pneumatic ram 65 and pusher plate or plunger 62 outwardly to eject the package 55 into the discharged section 24b of chute 24. The plunger 62 is then returned to normal position and the rearward flange 62b thereof rides across the forward end of the next package. When the plunger has been retracted into normal position, the next package will be moved up into engagement with the stop plate 25 and will again actuate the microswitch 70 to swing transfer arm 47 from article pickup position to article discharge position. It should be noted that each of the mechanisms of my apparatus is responsive for actuation to the occurrence of a particular event and these mechanisms do not require any synchronization one with the other. If the package does not engage the microswitch 70 indicating that no package is in the proper envelope receiving position, the transfer arm 47 remains stationary. Similarly, if no envelope is dropped through the hopper 54, the package ejector mechanism will not be energized and no package will be discharged without an envelope actually being inserted therein. This is extremely important in producing a machine which is automatic in its operation in order to insure one hundred percent accuracy in carrying out the desired function. It is also important to produce a machine which is relatively simple in its maintenance and operation. While it is of course necessary for an operator to keep the magazine racks 26 alternately filled and see that the packages travel smoothly into the feeding chute section 24a, the entire operation of the machine is automatic and the various steps in carrying out the desired function are entirely responsive to the predetermined positioning, first of the package in article-receiving position and the envelope in pickup position, and thereafter of the movement of envelope as it is discharged through the hopper 54. All of the elements of my apparatus work in close cooperation to produce machinery which initially positions articles to be packed in a substantially predetermined pickup position and constantly feeds said articles into said pickup position and thereafter whenever an open topped package or container is shifted into article-receiving position an article is individually picked up from its pickup position and transferred into article discharge position directly over the open topped package at which point the article is dropped into the package and the package is discharged back into the moving line and the next package moves into article-receiving position and the transfer mechanism returns to article pickup position.

It will, of course, be understood that various changes may be made in the form, details, arrangement and proportions of the parts without departing from the scope of my invention.

What I claim is:

1. Automatic apparatus for depositing articles into successively positioned open topped containers progressively moving from one location to another, said apparatus comprising a supporting structure, means mounted on said structure for supplying articles to an article pickup position, a transfer discharge station disposed in spaced relation to said article pickup position, conveyor means mounted on said structure for supplying open topped containers successively an article-receiving position disposed below said transfer discharge station, a control system having an actuating element disposed at said article-receiving position and responsive for actuation to the moving of a container into said position to actuate the article transfer mechanism, said article transfer mechanism including an article pickup element and having means for normally holding an article in engagement with said element and having shifting mechanism for carrying an article picked up at said pickup position to the transfer discharge station with means responsive to the positioning of the article in discharge position to release said article and deposit said article into the open topped container, container ejecting mechanism having a sensing element responsive for actuation to the actual physical passing of an article into said container, and means for retracting said ejecting mechanism after ejecting said container.

2. Automatic apparatus for depositing articles into open topped containers progressively moving along an assembly line, said apparatus being adapted to be interposed into said assembly line and comprising a supporting structure, a conveyor mechanism mounted on said supporting structure and adapted to be positioned to receive containers at one end thereof from the progressively moving assembly line and to discharge said containers at the other end thereof back into said line, said conveyor including laterally offset guiding means with a container abutment formed at the offset therein to hold a container in article-receiving position, an article transfer mechanism for moving articles successively into discharge position above the container held in article-receiving position, a control system responsive to the positioning of the container in article-receiving position for actuating said article transfer mechanism to deposit an article into said container, and means the actuation of which is responsive solely to the actual physical passage of an article into said container for ejecting the container into the offset section of the guiding means for delivery back into said moving assembly line.

3. Automatic apparatus for depositing an article into an open topped container, said apparatus being entirely responsive for completion of its operative cycle to two factors; first, the actual physical positioning of a container into article-receiving position, and second, the actual physical passage of an article into said container; said apparatus comprising means for moving a container into article-receiving position, stop means for holding said container in article-receiving position, a supply source of articles to be deposited in said packages, transfer mechanism for shifting an article from said supply source to deposit said article into a container in article-receiving position, a control system responsive for actuation to the actual physical positioning of a container in article-receiving position to actuate said transfer mechanism and carry an article from the supply source to the container and deposit said article therein, container ejecting mechanism for shifting the container out of article receiving position to permit the next successive container to move therein, and a control system for actuating said container ejecting mechanism with a sensing element entirely responsive to the actual physical passage of an article downwardly into the open top of said container in article receiving position.

4. Automatic apparatus for successively depositing articles into containers successively positioned to receive the same, said apparatus comprising a supporting structure, means for positioning a container in article receiving position, mechanism for transferring an article from an article supply source to deposit said article in said container, an electromagnetic control system for actuating said transfer mechanism and being solely responsive to the actual physical positioning of a container in article-receiving position, a container ejecting mechanism for positively ejecting a container out of article-receiving position to permit the next container to move into article receiving position, and including an electromagnetic control system having a sensing element solely responsive to the actual physical passage of an article into the container for actuating the package ejecting mechanism.

5. Automatic machinery for depositing articles into successively positioned packages progressively moving from one location to another, said machinery comprising a conveyor mechanism, said mechanism including a single endless belt trained about at least a pair of longitudinally spaced pulleys, means for constantly driving one of said pullleys for producing constant movement of said belt, package guiding means mounted in upstanding relation above said belt for guiding packages carried thereby, stop means for engaging successive packages to hold the same in article-receiving position, article transfer mechanism responsive for actuation to the positioning of a package in article-receiving position, article transfer mechanism responsive for actuation to the positioning of a package in article-receiving position, said transfer mechanism carying articles from a source of supply to deposit said articles into successive packages, package releasing mechanism including a sensing element responsive for actuation to the actual physical passage of a predetermined number of articles into each container for releasing said package from article-receiving position to permit the next package to move therein, said conveyor belt being constructed to permit sliding movement along said packages during the depositing of an article into a package held in article-receiving position.

6. Automatic machinery for depositing articles into containers progressively moving from one location to another and successively positioned in article-receiving position, said machinery comprising means for delivering a container into article receiving position, means for holding a container in said position until an article is deposited therein, an article supply mechanism including a magazine shiftably mounted and having at least a pair of upstanding racks, means for selectively shifting said racks into article supply position, article transfer mechanism including an article pickup assembly for engaging an article held in article supply position in said rack to remove said article therefrom and transfer said article to said container, and container releasing means to deliver the container out of article-receiving position.

7. The structure set forth in claim 6, and said article pickup assembly comprising a slightly elongated generally upstanding tubular member having an article engaging cup at the bottom thereof yieldably mounted in said article pickup assembly for upward shifting movement when an article is engaged to prevent the necessity of precise positioning of an article in pickup position.

8. The structure set forth in claim 6, and mechanism associated with the rack in article supply position to successively shift the articles held therein into article pickup position.

9. The structure set forth in claim 8, and an electro magnetic control system responsive to the positioning of an article in article pickup position and operatively associated with said article shifting mechanism to render said article shifting mechanism inoperative when an article is located in article pickup position.

10. Automatic machinery for depositing articles into containers progressively moving from one location to another and successively positioned in article-receiving position, said machinery comprising means for delivering a container into article-receiving position, means for holding said container in said position until an article is deposited therein, an article supply mechanism having at least one upstanding rack in which articles to be deposited are adapted to be stacked, an intermittently driven lifting mechanism consisting in an intermittent driving mechanism and a chain and sprocket driving mechanism driven thereby and having one run of said chain disposed in close association to said rack, said rack and said chain having cooperatively engaging elements for intermittently lifting articles stacked in said rack to maintain an article in pickup position at the upper portion of said rack, means responsive to the positioning of an article in pickup position for rendering said intermittent driving mechanism inoperative, and article transfer mechanism for receiving an article in pickup position and transferring said article into discharge position to deposit said article into a container held in article-receiving position.

11. The structure set forth in claim 10, and a hand operated crank connected with a sprocket wheel meshed with said chain for initially positioning a stack of articles with the top article in pickup position.

12. Automatic machinery for depositing articles into containers progressively moving from one location to another and successively positioned in article-receiving position, said machinery comprising means for delivering a container into article receiving position, means for holding the container in said position until an article is deposited therein, means for supplying articles successively to a pickup position disposed in spaced relation to said article-receiving position of the containers, an article transfer mechanism comprising an oscillating arm journalled for oscillation between said article pickup position and an article discharge position disposed above the article receiving position of said containers, a head mounted at the outer end of said arm and having vertically disposed guiding means formed therein, a vertically sliding member shiftably mounted in said vertically disposed guiding means and normally positioned in downwardly shifted position but shiftable upwardly when engaged by an article disposed above normal pickup position to prevent injury to said article.

13. The structure set forth in claim 12, and an oscillating shaft fixed to said transfer arm for driving the same, means for oscillating said shaft, a stub shaft journalled for oscillation at the outer end of said arm and providing a mounting for said head, a pair of wheels respectively fixed to said shafts, and an endless driving element trained about said wheels to produce a similar rotation in said stub shaft to that produced in said oscillating shaft and maintain said vertically shiftable member in upstanding relationship during the swinging movement of said arm.

14. Automatic machinery for depositing articles into containers progressively moving from one location to another and successively positioned in article-receiving position, said machinery comprising means for delivering an open topped container into article-receiving position, means for supplying articles to an article pickup position, an article transfer mechanism responsive for actuation to the movement of an open topped container into article receiving position to carry an article from pickup position to discharge position, a hopper disposed immediately below said article discharge position and above a container in article-receiving position and having a large upper mouth opening to receive an article discharged from said transfer mechanism when in discharge position, and container releasing means having a sensing element responsive for actuation to positive engagement with an article passing through said hopper and constructed to release a container from article-receiving position after a momentary lag permitting the article to pass from the hopper into the container.

15. Automatic apparatus for depositing articles into successively positioned containers progressively moving from one location to another, said apparatus comprising conveyor means for delivering a container into article-receiving position, stop means at said article-receiving position, means defining an article supply position, an article transfer mechanism including an article engaging suction element, means for supplying air under negative pressure to said suction element, an air control valve in said negative pressure air supply means, means responsive to the positioning of said article engaging element for actuating said valve to release said negative air pressure when said article engaging element is in discharge position to release the article held therein, a control system responsive for actuation to the positioning of a container in article-receiving position and actuating said article transfer mechanism to shift an article from article supply position to article discharge position, mechanism for moving the container from article-receiving position after completion of the article depositing operation and including a sensing element responsive for actuation solely to the actual physical passing of an article into said container.

16. The structure set forth in claim 15, and an article guiding hopper interposed between the article discharge position of said transfer mechanism and the article receiving position for said containers to guide an article discharged from said article engaging element, and said container moving mechanism being responsive to the passage of an article through said hopper.

17. The structure set forth in claim 15, and a pneumatic system including a pair of pneumatic rams and electromagnetic controls therefor respectively connected with said article transfer mechanism and said container moving mechanism for respective actuation thereof.

18. Automatic apparatus for depositing articles into open topped containers progressively moving along an assembly line, said apparatus being adapted to be interposed into said assembly line, said apparatus comprising a supporting structure, a conveyor mechanism mounted on said structure to receive containers at one end thereof from a progressively moving assembly line and to discharge said containers at the other end thereof back into said lines, a pair of laterally offset guiding chute sections extending upwardly from said conveyor mechanism and forming a feeding section and a discharge section, a container abutment stop member interposed between said two sections for holding a container in article-receiving position when engaged thereagainst, an article transfer mechanism successively delivering articles to containers positioned in said article-receiving position, a control unit having a shiftable element responsive for shifting movement for actuating said transfer mechanism to the positioning of a container in article-receiving position, a guiding hopper disposed above said article receiving position for guiding an article discharged from said transfer mechanism into an open topped container disposed in article-receiving position, and a pneumatically actuated container ejecting mechanism mounted on said supporting structure for ejecting a container into said discharge guiding chute section after an article has been deposited into said container, an actuating element disposed in said hopper for actuating said ejecting mechanism when an article passes through said hopper, the pneumatic mechanism producing a momentary lag in the actuation thereof permitting the article to pass from the hopper into the container before ejection of the container.

19. The structure set forth in claim 18, and an article supply mechanism mounted on said supporting structure for successively delivering articles into a substantially predetermined pickup position for pickup by said article transfer mechanism.

20. Automatic apparatus for depositing articles into successively positioned containers progressively moving from one location to another, said apparatus comprising stop means for positioning a container in article-receiving position, means defining an article supply position remote from said article-receiving position, mechanism for transferring an article from article supply position into a container disposed in article receiving position and responsive for actuation to the actual physical positioning of a container in article-receiving position, and a container ejecting mechanism for positively shifting a container out of article-receiving position and including a sensing element responsive for actuation solely to the actual physical passage of an article into said container.

21. The structure set forth in claim 20, and means for returning said transfer mechanism to article supply position and for returning said container ejecting mechanism into normal retracted position.

22. Automatic apparatus for depositing articles into successively positioned open-topped containers progressively moving from one location to another, said apparatus comprising a supporting structure, conveyor means for supplying open-topped containers successively to an article-receiving position, article guiding means above said article-receiving position, means cooperatively associated with said article guiding means for successively supplying articles thereto to deliver said articles into open-topped containers disposed in article-receiving position, container shifting mechanism having a sensing element disposed adjacent to said article guiding means to sense the passage of an article therethrough and thereafter actuating said package shifting mechanism to permit the next package to be carried into article-receiving position.

23. Automatic apparatus for depositing articles into successively positioned open-topped containers, said apparatus comprising conveyor means for delivering said open-topped containers to an article-receiving position, means holding said containers successively in article-receiving position until articles have been deposited therein, means delivering articles into containers disposed in article-receiving position, a sensing element disposed above the location of the open tops of said containers lying in the path of the articles during their delivery into said containers, a container releasing mechanism responsive for actuation to said sensing element to successively release said containers from article-receiving position after a momentary time interval has elapsed between the sensing of the actual physical passage of an article by said article sensing element.

References Cited in the file of this patent

UNITED STATES PATENTS

| | | |
|---|---|---|
| 1,867,113 | Strandt | July 12, 1932 |
| 1,909,050 | Ferguson | May 16, 1933 |
| 2,074,815 | Tevander et al. | Mar. 23, 1937 |
| 2,131,843 | McMakin | Oct. 4, 1938 |
| 2,319,167 | Stewart | May 11, 1943 |
| 2,322,175 | Talbot et al. | June 15, 1943 |
| 2,332,156 | Long | Oct. 19, 1943 |
| 2,440,354 | Auberman | Apr. 27, 1948 |
| 2,445,713 | Glassner | July 20, 1948 |